J. R. ALEXANDER.
INDICATOR FOR BALING PRESSES.
APPLICATION FILED SEPT. 24, 1908.
911,106.
Patented Feb. 2, 1909.
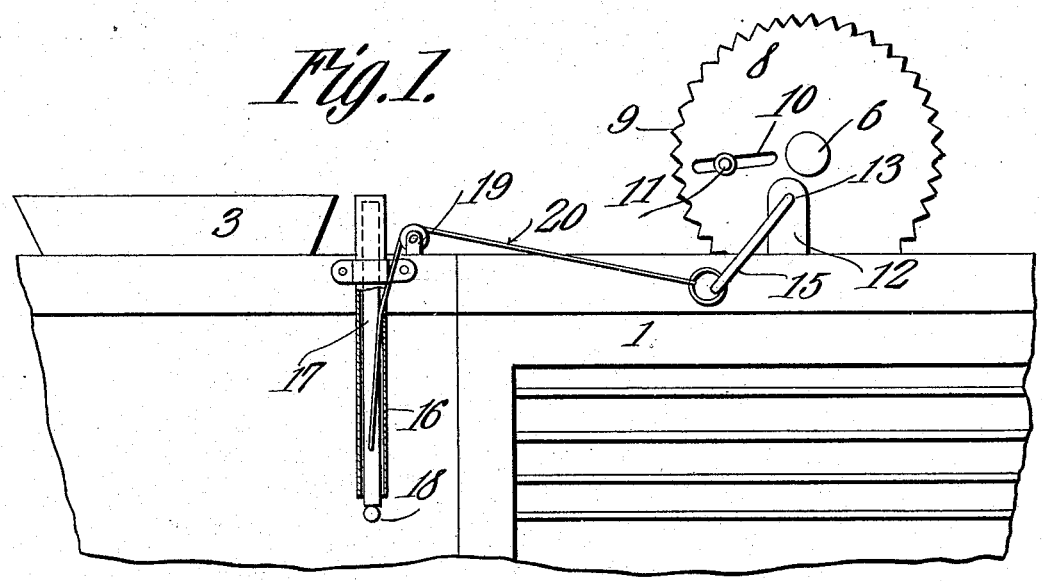
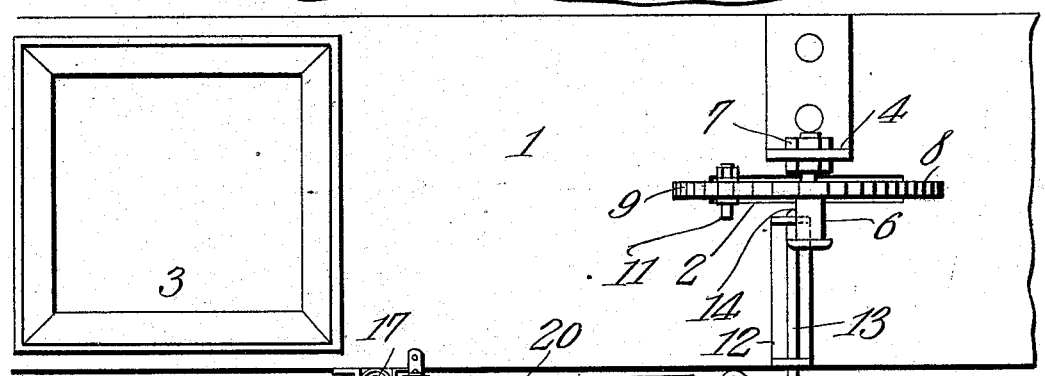
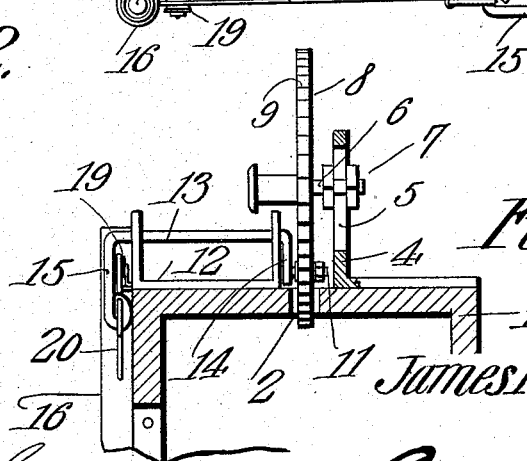
Inventor
James R. Alexander.
Witnesses
By C. A. Snow & Co.
Attorneys

UNITED STATES PATENT OFFICE.

JAMES R. ALEXANDER, OF NORTH YAKIMA, WASHINGTON.

INDICATOR FOR BALING-PRESSES.

No. 911,106.  Specification of Letters Patent.  Patented Feb. 2, 1909.

Application filed September 24, 1908. Serial No. 454,505.

*To all whom it may concern:*

Be it known that I, JAMES R. ALEXANDER, a citizen of the United States, residing at North Yakima, in the county of Yakima and State of Washington, have invented a new and useful Indicator for Baling-Presses, of which the following is a specification.

This invention has relation to indicators for baling presses, and it consists in the novel construction and arrangement of its parts, as hereinafter shown and described.

The object of the invention is to provide an indicator of the character stated, which may be easily and readily applied to the baling box of a press, and which, when in proper position upon the same, is adapted to exhibit or display a signal for the purpose of announcing the completion or the proximity of completion of the bale within the press.

A principal object of the invention is to so arrange the parts that the said signal is concealed and virtually out of the way during the major portion of the time in which the bale is being formed, and is exhibited only at such times as the bale is nearing completion, or is actually completed. Means is provided in the structure whereby the said signal may be exhibited to a greater or less extent, as desired.

Figure 1, is a side elevation of the indicator applied to a baling box. Fig. 2. is a top plan view of the same. Fig. 3, is a sectional view of the same.

As shown in the accompanying drawings, the baling box 1 is provided with a slot 2, which is located just behind the receiving hopper 3. The standard 4 is attached to the upper side of the box 1, and is provided with a vertically disposed slot 5. The pin 6 passes transversely through the slot 5 and the nuts 7 are screw-threaded upon the said pin and are adapted to bear against the opposite sides of the standard 4. Thus means is provided for adjusting the said pin 6 vertically along the standard 4 and for securing the same in an adjusted position.

The wheel 8 is journaled for rotation upon the pin 6, and is provided upon its periphery with the teeth 9. The lower portion of the wheel 8 projects down through the slot 2 provided in the top of the box 1, and the teeth 9 thereof are adapted to come in contact with the upper side of the bale as it is being formed in the box 1. The wheel 8 is provided with a radially disposed slot 10, in which is adjustably located the pin 11.

The bracket 12 is mounted upon the top of the box 1 at the opposite side of the slot 2 from that upon which the standard 4 is mounted. A shaft 13 is journaled for rotation in the bracket 12, and is provided at its inner end with the crank portion 14. The said crank portion 14 lies in the path of movement of the pin 11 which is carried by the wheel 8. The outer end of the shaft 13 is formed into the depending crank portion 15.

The sleeve 16 is vertically mounted upon the side of the baling box 1, and the rod 17 is slidably mounted within the said sleeve 16.

The stop 18 is attached to the side of the baling box 1 immediately below the lower end of the sleeve 16, and in the path of movement of the said rod 17.

The guide 19 is attached to the top of the box 1, in the vicinity of the upper end of the sleeve 16.

The cable 20 is connected at one end with the rod 17 and passes through the guide 19 and is attached at its opposite end to the crank portion 15 of the shaft 13.

The operation of the indicator is as follows:—As the bale is being formed in the box 1 and passes through the same, the teeth 9 upon the periphery of the wheel 8 engage the upper side of the bale, and the said wheel 8 is rotated upon the pin 6. As the formation of the bale progresses and arrives at the point of completion, the pin 11, carried by the wheel 8, is brought into contact with the crank portion 14 of the shaft 13, and the said shaft 13 is rocked in the bracket 12. When the shaft 13 moves as indicated, the crank 15 is swung horizontally along the edge of the box 1, and the cable 20 is moved longitudinally. The movement of the said cable moves the rod 17 vertically in the sleeve 16, so that the upper end of the said rod will project beyond the upper end of the said sleeve, and become visible. This serves as an ocular signal that the bale is about completed, and when the pin 11 escapes or passes beyond the crank portion 14 of the shaft 13, the operation of the intervening parts above described is reversed, and the rod 17, acted upon by gravity, falls down within the sleeve 16, and seats upon the stop 18. The sudden descent of the said rod 17 indicates that the bale is completed, and the operators may then cease to feed the press and apply the bale-bands to the completed bale.

By such an arrangement it is obvious that all of the bales will be of uniform size, and consequently will contain a uniform amount of material. By adjusting the pin 11 in the slot 10 it will also be seen that the sizes of the bale may be increased or diminished, as desired.

Inasmuch as the device which forms the subject matter of this invention is in the nature of an attachment, the vertical slot in the standard 4 makes it possible to apply the device to any bale box, irrespective of the thickness of the material constituting the top thereof. Also the size of the bale may be regulated by adjusting the pin 6 in the slot 5 of the standard 4.

Having described my invention, what I claim as new, and desire to secure, by Letters Patent, is:—

1. A signal for baling presses comprising a sleeve, a signal slidably mounted in the sleeve and means attached to the signal and adapted to move the same above the end of the sleeve as the formation of the bale progresses.

2. A signal for baling presses comprising a sleeve, a signal proper slidably mounted in the sleeve, a wheel mounted upon the press and having contact with the bale, a pin carried by the wheel, a shaft journaled upon the press and having a crank in the path of movement of the said pin, said shaft being provided with a crank at its opposite end and a cable connecting the last said crank with the said signal.

3. A signal for a baling press comprising a standard adapted to be attached to the box of the press, a wheel adjustably mounted upon said standard and adapted to have contact with the bale during the course of its formation within the press, a pin carried by the wheel, a shaft journaled upon the press and having a crank end located in the path of movement of the said pin and being provided at its other end with a crank extremity, a sleeve adapted to be vertically positioned upon the box of the press, a signal slidably mounted in said sleeve and a cable connecting said signal with the crank extremity of said shaft.

4. A signal for a baling press comprising a standard adapted to be positioned upon the baling box of the press, a wheel adjustably mounted upon said standard and adapted to have contact with the bale during the course of its formation, a pin adjustably mounted upon said wheel, a shaft journaled upon the baling box of the press and having at one end a crank which lies in the path of movement of the pin mounted upon the wheel and being provided at its other end with a crank, a sleeve adapted to be vertically positioned upon the baling box of the press, a signal slidably mounted in said sleeve, and a cable connecting said signal with the last said crank of the said shaft.

5. A signal for baling presses comprising a standard having a vertically disposed slot, a pin adjustably mounted in said slot, a wheel journaled upon said pin and adapted to have contact at its periphery with the bale during the course of its formation in the press, a pin adjustably mounted upon the said wheel, a shaft journaled upon the baling box of the press and having at one end a crank extremity which lies in the path of movement of the means carried by the said wheel, and at its other end being provided with the crank extremity, a sleeve vertically positioned upon the baling box of the press, a signal slidably mounted in said sleeve, and a cable connected at one end with the said signal and at its other end with the last said crank extremity of the said shaft, and a pulley mounted upon the baling box of the press and being located in the vicinity of the sleeve.

In testimony that I claim the foregoing as my own, I have hereto affixed my signature in the presence of two witnesses.

JAMES R. ALEXANDER.

Witnesses:
MARTIN SCHICHEL,
SENCER DUNHAM.